United States Patent [19]

Noguchi et al.

[11] Patent Number: 5,736,066
[45] Date of Patent: Apr. 7, 1998

[54] OPTICALLY ANISOTROPIC FILM

[75] Inventors: Takanobu Noguchi; Toshihiro Ohnishi; Michitaka Morikawa; Masato Kuwabara, all of Tsukuba, Japan

[73] Assignee: Sumitomo Chemical Company, Limited, Osaka, Japan

[21] Appl. No.: 555,807

[22] Filed: Nov. 9, 1995

[30] Foreign Application Priority Data

| Nov. 10, 1994 | [JP] | Japan | 6-276570 |
| Apr. 10, 1995 | [JP] | Japan | 7-083920 |
| Apr. 10, 1995 | [JP] | Japan | 7-083921 |
| Jul. 11, 1995 | [JP] | Japan | 7-174696 |

[51] Int. Cl.$^6$ ............................ C09K 19/52; C09K 19/00
[52] U.S. Cl. ................................. 252/299.01; 428/1.1
[58] Field of Search ........................ 252/299.01; 428/1

[56] References Cited

U.S. PATENT DOCUMENTS

| 5,245,456 | 9/1993 | Yoshimi et al. | 359/73 |
| 5,308,535 | 5/1994 | Scheubic et al. | 252/299.01 |
| 5,472,635 | 12/1995 | Iida et al. | 252/299.01 |
| 5,543,267 | 8/1996 | Stumpe et al. | 430/290 |
| 5,601,884 | 2/1997 | Ohnishi et al. | 428/1 |

FOREIGN PATENT DOCUMENTS

| 0 544 015 A1 | 6/1993 | European Pat. Off. . |
| 0 546 748 A1 | 6/1993 | European Pat. Off. . |
| 0 587 890 A1 | 3/1994 | European Pat. Off. . |
| 0 591 536 A1 | 4/1994 | European Pat. Off. . |
| 6171111 | 9/1994 | European Pat. Off. . |
| 0 620 457 A2 | 10/1994 | European Pat. Off. . |
| 3291601 | 12/1991 | Japan . |
| 4500284 | 1/1992 | Japan . |
| 5027119 | 2/1993 | Japan . |
| 5107413 | 4/1993 | Japan . |
| 5157911 | 6/1993 | Japan . |
| 5257013 | 10/1993 | Japan . |
| 6027433 | 2/1994 | Japan . |
| 6130227 | 5/1994 | Japan . |
| 6174923 | 6/1994 | Japan . |
| 6300916 | 10/1994 | Japan . |
| 6331826 | 12/1994 | Japan . |

*Primary Examiner*—C. H. Kelly
*Attorney, Agent, or Firm*—Birch, Stewart, Kolasch & Birch, LLP

[57] ABSTRACT

The present invention provides an optically anisotropic film characterized in that the retardation at 80° C. is 20–97% of that at 30° C., and the film is made from a mixture of a transparent or semitransparent polymer and at least one liquid crystal compound, wherein the ratio of the liquid crystal compound in the mixture is 0.5–50% by weight based on the combined weight of the liquid crystal compound and the polymer, or an optically anisotropic film characterized in that the retardation at 60° C. is 50–99% of that at 30° C., and the film comprises a mixture of a transparent or semitransparent polymer and at least one liquid crystal compound, wherein the ratio of the liquid crystal compound in the mixture is 0.5–50% by weight based on the combined weight of the liquid crystal compound and the polymer. These optically anisotropic films have a temperature dependence of retardation corresponding to that of the liquid crystal display cell used in combination with the film, show a temperature compensating effect, and are also excellent in viewing angle characteristics and display performance, so that they can be used for the production of composite optically anisotropic films or liquid crystal display devices.

19 Claims, No Drawings

OPTICALLY ANISOTROPIC FILM

BACKGROUND OF THE INVENTION

The present invention relates to an optically anisotropic film used for super twisted nematic (STN) type or electric field-controlled birefringence (ECB) type liquid crystal displays and the like, a process for the production thereof, and a liquid crystal display device using said film.

A retardation film can be obtained by uniaxially stretching a transparent thermoplastic polymer film and is used as an optical compensator (color compensator) to compensate for tinting in especially STN type or ECB type liquid crystal displays to improve their display performance. The liquid crystal display devices using such retardation films have advantages such as light weight, small thickness and low cost.

Recently, the opportunity of use of liquid crystal devices under a high-temperature condition has increased. For instance, they are adapted in a car navigation system which is set in an automobile for providing a visual geographical information and is gaining popularity among motorists.

Request is rising for application of relatively inexpensive STN type liquid crystal display to such use. However, use of such liquid crystal display under a high temperature condition involves a problem of reduced display performance because of difference in retardation between the STN liquid crystal cell and the retardation film at high temperatures. Use of an STN liquid crystal cell improved in viewing angle characteristics and response speed has also been considered. In this case, however, there arises a problem of reduced display performance such as low contrast due to insufficient compensation of tinting because the liquid crystal material used for the STN cell has a large wavelength dispersion of birefringence and differs from that of the retardation film made of a polycarbonate, which is most popularly used at present.

Further, with enlargement of image area of the STN type liquid crystal displays, the problem has arisen that the temperature in the liquid crystal cell may become nonuniform due to heat conducting from the cold cathode tube used for backlight, resulting in different display performance in an image area.

Of these problems, the viewing angle characteristics have been considerably improved by adjusting double refraction (birefringent) properties, namely viewing angle dependence of retardation, by a pertinent method such as use of an optically anisotropic film whose refractive index has been three-dimensionally controlled, so as to compensate for viewing angle dependence of birefringent properties of the liquid crystal cell. Nevertheless, there is yet available no optically anisotropic film which can meet both requirements for display quality and viewing angle characteristics in a use environment which may be exposed to a high temperature, such as interior of an automobile.

Reduction of display performance of the liquid crystal display devices at high temperatures may be attributed to the fact that generally alignment of the liquid crystal molecules or polymer is relaxed as the ambient temperature rises, and in this case, the degree of alignment relaxation of the low-molecular weight liquid crystal used for the liquid crystal cell becomes higher than that of the polymer used for the retardation film, resulting in a greater change of retardation, so that the retardations in said two members, which has been set to be optimized at room temperature, deviates from the optimal level under high temperatures, resulting in imperfect color compensation of the liquid crystal cell to cause tinting and other problems leading to reduction of display performance. Thus, an optically anisotropic film which allows variation of retardation in conformity to the change of birefringence of the liquid crystal cell with temperature has been required.

Further, in the high-speed-response STN type liquid crystal displays, a retardation film having the wavelength dispersion characteristics corresponding to those of the liquid crystal material used in STN cell and variable in retardation in accordance with the change of retardation with temperature of the liquid crystal cell has been required.

Various types of optically anisotropic films using a liquid crystal material have been proposed.

JP-A-3-291601 discloses a process for producing a retardation film according to which in order to obtain a large-area and uniform retardation film, a solution having dissolved therein a liquid crystalline polymer substantially comprising a polyester having the ortho-substituted aromatic structural units is applied on a substrate having a known alignment film and subjected to a heat treatment to effect horizontal alignment.

Retardation in a retardation film is given as the product of refractive anisotropy of the film material and film thickness. In a retardation film in which only those of the liquid crystalline polymer molecules having large anisotropy of refractive index have been horizontally aligned, it needs to control the liquid crystalline polymer film thickness very precisely for obtaining uniform retardation throughout the film. This is, however, difficult and impractical in industrial terms.

JP-T 4-500284 discloses a retardation film having the same temperature dependence and wavelength dependence as the liquid crystal molecules used in the liquid crystal cell, said film comprising a side chain type liquid crystal polymer having a linear or cyclic backbone. It is, however, difficult to make highly precise control of thickness of a film made of a side chain type liquid crystal polymer with large anisotropy of refractive index.

JP-A-5-257013 discloses a retardation film obtained by dispersing the liquid crystal molecules in a polymer film and stretching this film. But this patent is silent on what combination of liquid crystal compound and polymer will provide the desired effect.

Also, the following proposals have been made regarding means for controlling refractive index in the thickness direction of an optically anisotropic structure.

JP-A-6-300916 discloses a method in which when a stretched film of a polycarbonate or other like material is relaxed by heating at a temperature not lower than the glass transition temperature or the softening temperature of the film, the film is shrunk in the stretching direction while suppressing enlargement along the vertical axis of stretching direction, thereby to control the refractive index of thickness direction of film.

JP-A-5-157911 proposes a method in which a heat shrinkable film is bonded on at least one side of a uniaxially stretched thermoplastic resin film so that the axis of heat shrinkage will cross the axis of stretch of said thermoplastic resin film at right angles, and then this film combination is stretched, thereby to control the refractive index of thickness direction of film.

JP-A-6-331826 proposes a method for controlling the refractive index of thickness direction of film by combining a uniaxially stretched polymer film and a vertically aligned liquid crystal polymer film.

The optically anisotropic films disclosed in the above patents are indeed effective for reducing viewing angle dependence, but since a stretched film of a polymer having a high glass transition temperature is used, the change of retardation with temperature is very limited and insufficient for compensating temperature dependence of birefringence of the liquid crystal cell.

In the case of the films using polymer liquid crystal, since the polymer liquid crystal is first aligned and then its alignment is fixed by cooling, it is necessary to use a polymer liquid crystal whose transition temperature from the liquid crystal phase to the glass phase is well higher than room temperature. However, since the glass transition temperature or crystallization temperature of the liquid crystal used in the liquid crystal cell is below room temperature, the temperature compensating effect is unsatisfactory.

Regarding the films having a liquid crystal dispersed in a polymer, no proposal has ever been made on control of refractive index in the thickness direction. Thus, there is known no temperature compensation type optically anisotropic body whose refractive index in the thickness direction is controlled.

As a means for improving wavelength dispersion characteristics of retardation film, JP-A-5-107413 proposes use of a polysulfone having high wavelength dispersion characteristics as retardation film material. For the same purpose, JP-A-6-174923 proposes use of a polyarylate with large wavelength dispersion.

In both cases, however, since the polysulfone or polyarylate with large wavelength dispersion used here has a high glass transition temperature, retardation remains almost unchanged in the working temperature range. Therefore, it is difficult to let retardation in the film change in accordance with the change of retardation with temperature of the liquid crystal cell.

Also, since wavelength dispersion by retardation differs depending on the liquid crystal material used for the liquid crystal cell, it may be required to control wavelength dispersion of the retardation film.

JP-A-5-27119 and JP-A-6-130227 propose control of wavelength dispersion by combining the optically anisotropic films with different degrees of wavelength dispersion. In any of these patents, however, no disclosure is made of compensation in the high temperature region by the change of retardation with temperature.

SUMMARY OF THE INVENTION

The object of the present invention is to provide an optically anisotropic film having a temperature dependence of retardation corresponding to that of the liquid crystal display cell used in combination with said film; an optically anisotropic film having the retardation wavelength dispersion characteristics and temperature characteristics close to those of the liquid crystal display cell used in combination with said film; an optically anisotropic film capable of reducing viewing angle dependence of retardation of the liquid crystal display cell used in combination with said film and having the temperature characteristics close to those of said cell; a process for producing said optically anisotropic films; and a liquid crystal display device, particularly an STN or ECB type liquid crystal display device, using said optically anisotropic film and having excellent display performance at high temperatures.

According to the present invention, there is provided an optically anisotropic film characterized in that retardation at 80° C. is 20–97% of that at 30° C., and said film comprises a mixture of at least one liquid crystal compound and a transparent or semitransparent polymer, the ratio of said compound being 0.5–50% by weight based on the total weight of said liquid crystal compound and said polymer.

The present invention also provides an optically anisotropic film in which retardation at 60° C. is 50–99% of that at 30° C. and which comprises a mixture of at least one liquid crystal compound and a transparent or semitransparent polymer, the ratio of said compound being 0.5–50% by weight based on the total weight of said liquid crystal compound and said polymer.

The present invention further provides an optically anisotropic film characterized in that retardation at 80° C. is 20–97% of that at 30° C., and that the value of α given from the following equation (2) exceeds 1.06:

$$\alpha = R_F/R_D \quad (2)$$

wherein $R_F$ is the value of retardation determined with F line (wavelength: 486 nm) of hydrogen, and $R_D$ is the value of retardation determined with D line (wavelength: 589 nm) of sodium.

The present invention also provides a process for producing an optically anisotropic film, which comprising mixing a polymer and at least one liquid crystal compound, molding the mixture into a film, and uniaxially stretching the film under heating.

The present invention further provides an optically anisotropic film characterized in that the value of retardation measured from the frontal side of the film at 30° C. is 50–3,000 nm, the retardation at 80° C. is 20–97% of that at 30° C., and the ratio of the retardation values ($R_{40}/R_0$) at 30° C. is defined by the following relation:

$$0.900 < R_{40}/R_0 < 1.100 \quad (1)$$

wherein $R_{40}$ is the value of retardation measured in a state where the optically anisotropic film has been tilted 40° from the horizontal, with the slow axis as the axis of rotation in the case of an optically anisotropic film having positive intrinsic birefringence and with the fast axis as the axis of rotation in the case of an optically anisotropic film having negative intrinsic birefringence, in a polarization microscope provided with a Sénarmont compensator, and $R_0$ is the value of retardation measured in a non-slanted state (horizontal state), and a process for producing said optically anisotropic film.

The present invention additionally provides a composite optically anisotropic film comprising a laminate of an optically anisotropic film made by uniaxially stretching a polymer whose Abbé's number ($v_D$) is less than 31, and an optically anisotropic film in which retardation at 80° C. is 20–97% of that at 30° C., and a process for producing said composite optically anisotropic film.

DESCRIPTION OF THE PREFERRED EMBODIMENTS

Efforts by the present inventors for solving said prior art problems have led to a finding that an optically anisotropic film in which retardation varies with temperature can be obtained by mixing at least one liquid crystal compound in a polymer (hereinafter the polymer may be called matrix polymer or simply matrix), molding the mixture into a film and stretching the film, and that by controlling the refractive index in the thickness direction of the film or by controlling wavelength dispersion of retardation of the film, in addition to utilization of the change of retardation with temperature, there can be obtained a liquid crystal display device having high white-and-black display quality as well as excellent display performance and viewing angle characteristics in the operating temperature range of the display device.

The present invention comprehends the following embodiments in its claimed scope.

(1) An optically anisotropic film characterized in that retardation at 80° C. is 20–97% of that at 30° C., and that said film comprises a mixture of at least one liquid crystal compound and a transparent or semitransparent polymer, the ratio of said compound being 0.5–50% by weight based on the combined weight of said liquid crystal compound and said polymer.

(2) An optically anisotropic film characterized in that retardation at 60° C. is 50–99% of that at 30° C., and that said film comprises a mixture of at least one liquid crystal compound and a transparent or semitransparent polymer, the ratio of said compound being 0.5–50% by weight based on the combined weight of said liquid crystal compound and said polymer.

(3) An optically anisotropic film set forth in (1) or (2), characterized in that the glass transition temperature of the polymer is 80° C. or above.

(4) An optically anisotropic film set forth in (1), (2) or (3), characterized in that the retardation of the film measured at a temperature 20° C. higher than the isotropic phase transition temperature of the liquid crystal compound is 90% or less of the retardation of said film at 30° C.

(5) An optically anisotropic film set forth in (4), characterized by using a polymer comprising a compatibilized mixture of a polymer having positive intrinsic birefringence and a polymer having negative intrinsic birefringence.

(6) An optically anisotropic film set forth in (1), (2),(3), (4) or (5), characterized in that haze of the film is 10% or less.

(7) An optically anisotropic film characterized in that the value of retardation measured from the frontal side of the film at 30° C. is 50–3,000 nm, the value of retardation at 80° C. is 20–97% of that at 30° C., and the ratio of the retardation values ($R_{40}/R_0$) at 30° C. is defined by the following relation:

$$0.900 < R_{40}/R_0 < 1.100 \tag{1}$$

wherein $R_{40}$ is the value of retardation measured in a state where the film has been slanted 40° from the horizontal with the slow axis as the axis of rotation in the case of an optically anisotropic film having positive intrinsic birefringence and with the fast axis as the axis of rotation in the case of an optically anisotropic film having negative intrinsic birefringence, in a polarization microscope provided with a Sénarmont compensator, and $R_0$ is the value of retardation in the non-slanted state (horizontal state).

(8) An optically anisotropic film set forth in (7) comprising a mixture of at least one liquid crystal compound and a transparent or semitransparent polymer, the ratio of said compound being 0.5–50% by weight based on the combined weight of said liquid crystal compound and said polymer.

(9) An optically anisotropic film characterized in that the value of retardation of the film at 80° C. is 20–97% of that at 30° C., and that the value of α defined by the following equation (2) exceeds 1.06:

$$\alpha = R_F/R_D \tag{2}$$

wherein $R_F$ is the value of retardation measured with F line (wavelength: 486 nm) of hydrogen, and $R_D$ is the value of retardation measured with D line (wavelength: 589 nm) of sodium.

(10) An optically anisotropic film set forth in (9) comprising a mixture of at least one liquid crystal compound and a transparent or semitransparent polymer, the ratio of said compound being 0.5–50% by weight based on the combined weight of said liquid crystal compound and said polymer.

(11) An optically anisotropic film set forth in (10), characterized in that the Abbé's number ($v_D$) of the transparent or semitransparent polymer defined by the following formula (3) is less than 31:

$$v_D = (n_D - 1)/(n_F - n_C) \tag{3}$$

wherein $n_C$, $n_D$ and $n_F$ are the refractive indices to C line (wavelength: 656 nm), D line (wavelength: 589 nm) and F line (wavelength: 486 nm), respectively, of the Fraunhofer line.

(12) An optically anisotropic film set forth in (10), characterized in that the value of α defined by the formula (2), which is shown when the liquid crystal compound was homogeneously aligned alone, exceeds 1.06.

(13) A composite optically anisotropic film comprising a laminate of an optically anisotropic film made by uniaxially stretching a polymer whose Abbé's number ($v_D$) is less than 31, and an optically anisotropic film in which retardation at 80° C. is 20–97% of that at 30° C.

(14) A process for producing an optically anisotropic film set forth in any of (1)–(6) or (9)–(12), which comprises mixing a polymer and at least one liquid crystal compound, molding the mixture into a film, and uniaxially stretching the film under heating.

(15) A process for producing an optically anisotropic film set forth in (7) or (8), which comprises mixing a polymer and a liquid crystal compound, molding the mixture into a film, stretching the film and further subjecting the film to a treatment for increasing alignment in the thickness direction.

(16) A process for producing a composite optically anisotropic film set forth in (13), which comprises laminating a polymer film having an Abbé's number of less than 31 and a film comprising a mixture of a polymer and at least one liquid crystal compound, and uniaxially stretching the laminated film.

(17) A liquid crystal display device using an optically anisotropic film set forth in any of (1)–(12) or (14).

The present invention is described in more detail below.

The optically anisotropic film in a first embodiment of the present invention is made of a mixture of a liquid crystal compound and a transparent or semitransparent polymer. Regarding the temperature dependance of retardation of this film, the film is characterized in that its retardation at 80° C. is 20–97%, preferably 60–95%, more preferably 70–93% of that at 30° C. When said dependence is less than 20%, the film proves poor in mechanical strength at high temperatures, and when the dependence exceeds 97%, the film is unable to sufficiently compensate for temperature dependence of retardation of the liquid crystal cell.

With reference to the temperature dependence of retardation, an optically anisotropic film in which retardation at 60° C. is 50–99%, preferably 60–98%, more preferably 70–97% of that at 30° C. is also included in the preferred embodiments of the present invention.

The term "compensation" is used here to refer to not only cancellation of the birefringence of the liquid crystal cell but also use of an optically anisotropic film for adjusting display hue in a liquid crystal display device (ECB mode) of the type in which color expression is made by the phase difference.

The optically anisotropic film according to a second embodiment of the present invention has the same temperature dependency of retardation as the film of the first embodiment described above and shows excellent viewing angle characteristics. A barometer of birefringence providing the excellent viewing angle characteristics is the ratio of retardation ($R_0$) of the film when it was placed horizontally to retardation ($R_{40}$) of the film when it was slanted 40° from the horizontal ($R_{40}/R_0$ ratio). In the optically anisotropic films according to the present invention, the $R_{40}/R_0$ ratio falls in the range defined below:

$$0.900 < R_{40}/R_0 < 1.100 \tag{1}$$

The optimal value of this ratio can be appropriately selected according to the viewing angle dependence of birefringence of the liquid crystal cell used in combination with the optically anisotropic film.

$R_{40}$ denotes retardation measured in a state where the optically anisotropic film was slanted 40° from the horizontal with the slow axis as the axis of rotation in the case of a film having positive intrinsic birefringence and with the fast axis as the axis of rotation in the case of a film having negative intrinsic birefringence, in a polarization microscope provided with a Sénarmont compensator.

The optically anisotropic film according to a third embodiment of the present invention shows the above-described temperature dependence of retardation and is also characterized by the fact that its retardation provides large wavelength dispersion. Therefore, when the value of α defined by the equation (2) is used as an index of wavelength dispersion, the film of this invention may be defined as one whose α value is larger than 1.06. As another embodiment of optically anisotropic film with high wavelength dispersion, the present invention also offers a composite type film comprising a laminate of an optically anisotropic film obtained by uniaxially stretching a polymer with high wavelength dispersion and an optically anisotropic film in which retardation at 80° C. is 20–97% of that at 30° C. The polymer with high wavelength dispersion used here needs to be one having an Abbé's number smaller than 31, but is subject to no other specific restrictions.

An optically anisotropic film with large wavelength dispersion can be obtained by using a liquid crystal compound with high wavelength dispersion by refractive index or a polymer with large wavelength dispersion. Examples of the liquid crystal compounds with large wavelength dispersion are the liquid crystal materials in which the α value defined by the equation (2) is larger than 1.06 and examples of those having large wavelength dispersion are the polymeric materials having an Abbé's number ($v_D$) smaller than 31. For producing the optically anisotropic films of the present invention, there can be used the materials having specific properties that birefringence decreases or increases reversibly in accordance with rise or fall of temperature. Examples of such materials include mixtures of liquid crystal compounds and polymers with high glass transition temperature or softening temperature, mixtures of low-molecular weight compounds and polymers with high glass transition temperature or softening temperature, and the crosslinked products of the polymers with low glass transition temperature or softening temperature. Of these materials, mixtures of liquid crystal compounds and polymers with high glass transition temperature or softening temperature are preferred from the viewpoint of reversible change of birefringence with temperature. Regarding the ratio of the liquid crystal compound and the polymer used in the present invention, the liquid crystal compound is used in a ratio of 0.5–50% by weight, preferably 1–30% by weight, more preferably 1–20% by weight, based on the total weight of the liquid crystal compound and the polymer. When said ratio is less than 0.5% by weight, no desired retardation may be provided by the liquid crystal compound, resulting in too low temperature dependence of retardation. When said ratio exceeds 50% by weight, film strength may be weakened. Specifically, said ratio can be determined properly within the above-defined range in consideration of film strength and temperature dependence of retardation of the produced film. Retardation of the optically anisotropic films according to the present invention preferably falls in a range of 50–3,000 nm, more preferably 100–2,000 nm, even more preferably 200–1,500 nm.

In the optically anisotropic film of the present invention, the retardation produced by a liquid crystal display cell, especially STN type liquid crystal display cell or ECB type liquid crystal display cell, is compensated by the matrix and the liquid crystal compound (which may hereinafter be referred to simply as liquid crystal) in the matrix, so that the liquid crystal used for said film is preferably one whose refractive index and other properties such as temperature dependence of refractive anisotropy are close to those of the liquid crystal used for the liquid crystal display cell.

The temperature dependence of retardation in the optically anisotropic film of the present invention can be selected to be optimal one in accordance with the temperature dependence of retardation of the liquid crystal display cell used in combination with said film. Specifically, when the temperature dependence of retardation of the liquid crystal display cell is large, the temperature dependence of retardation of the optically anisotropic film is accordingly increased, and when the temperature dependence of retardation of the liquid crystal cell is small, the temperature dependence of retardation of the optically anisotropic film is decreased correspondingly. Adjustment of the temperature dependence of retardation of the optically anisotropic film can be effected by various methods such as mixing the liquid crystal compounds differing in isotropic phase transition temperature; changing the mixing ratio of the matrix and the liquid crystal compound; using the matrix polymers differing in intrinsic birefringence; controlling the ratio of retardation of the matrix and the liquid crystal by changing the stretching conditions.

Light scattering by the optically anisotropic film of this invention is preferably minimized. The factors affecting light scattering include mismatching of refractive index of the liquid crystal and that of the matrix, and size of the mixed liquid crystal particles. It is undesirable to adjust refractive index of the matrix as it may cause change of the mechanical properties and/or other properties such solubility in solvents of the matrix, so that it is recommended to adjust refractive index of the liquid crystal. The refractive index for ordinary light of the liquid crystal used in the present invention is preferably in a range of 1.4–1.6.

For lessening light scattering, it is effective to reduce the particle size of the liquid crystal compound phase-separated in the polymer matrix. Haze is an index of the degree of light scattering. In the optically anisotropic film of the present invention, it is desirable that haze is as low as possible; it is preferably below 10%, more preferably below 7%.

The liquid crystal used in the present invention is preferably one which shows a nematic or smectic phase. The temperature range in which a nematic or smectic phase is shown is preferably −30° C. to 200° C., more preferably −30° C. to 150° C., even more preferably −30° C. to 120° C.

The liquid crystal compounds that meet the above requirement of temperature range may be used singly, or two or more types of such liquid crystal compounds may be used in admixture so as to fall in the above temperature range. The liquid crystal compounds usable in the present invention include low-molecular weight liquid crystal, liquid crystal oligomers, polymer liquid crystal and the like, but low-molecular weight liquid crystal or liquid crystal oligomers are preferred in view of miscibility with the matrix polymer. Liquid crystal oligomers are most preferred.

The low-molecular weight liquid crystal compounds usable in the present invention include those represented by the following formula [I]:

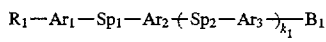   [I]

wherein $R_1$ represent a $C_{1-6}$ alkyl or alkoxy group; $Ar_1$, $Ar_2$ and $Ar_3$ represent independently a 1,4-phenylene group, a 1,4-cyclohexylene group, a pyridine-2,5-diyl group or a pyrimidine-2,5-diyl group; $Sp_1$ and $Sp_2$ represent independently —COO—, —OCO—, —NCH—, —CHN—, —CH$_2$—CH$_2$—, $_{CH2}$—O—, —O—CH$_2$—, —N=N—, —C≡C—, a single bond (synonymous with direct bond of $Ar_1$ and $Ar_2$ or $Ar_2$ and $Ar_3$) or a group represented by the following formula [II]:

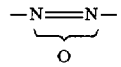   [II]

$k_1$ is an integer of 0 or 1 (when $k_1$ is 0, $Ar_2$ and $B_1$ are directly bonded); and $B_1$ is a hydrogen atom, a cyano group, a halogen, a $C_{1-6}$ alkyl or alkoxy group, an acrylate group or a methacrylate group.

The liquid crystal oligomers usable in the present invention include side chain type liquid crystal oligomers and main chain type liquid crystal oligomers, but the former type is preferred because of lower cost and greater ease for control of molecular weight.

Examples of the side chain type liquid crystal oligomers usable in this invention are those of the following formula [III]:

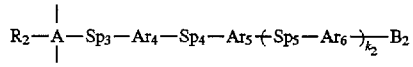   [III]

wherein A is a group represented by the following formula [IV] or [V]:

   [IV]

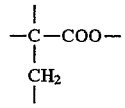   [V]

wherein in the formula [IV], —Si—O— is the main chain of the formula [III] which may be cyclic or linear, and in the formula [V], —C—CH$_2$— is the main chain of the formula [III] and COO group is bonded to Sp$_3$; when A in the formula [III] is the formula [IV], $R_2$ is a $C_{1-6}$ alkyl group or a phenylene group, and when A is the formula [V], $R_2$ is a $C_{1-6}$ alkyl or alkoxy group; $Ar_4$, $Ar_5$ and $Ar_6$ represent independently a 1,4-phenylene group, a 1,4-cyclohexylene group, a pyridine-2,5-diyl group, a pyrimidine-2,5-diyl group or a derivative of these groups; $Sp_3$ represents a $C_{2-8}$ alkyl or alkoxy group; $Sp_4$ and $Sp_5$ represent independently —COO—, —OCO—, —NCH—, —CHN—, —CH$_2$—CH$_2$—, —CH$_2$—O—, —O—CH$_2$—, —N=N—, —C≡C—, a single bond (synonymous with direct bond of $Ar_4$ and $Ar_5$ or $Ar_5$ and $Ar_6$) or a group represented by the above-shown formula [II]; $k_2$ is an integer of 0 or 1 (when $k_2$ is 0, $Ar_3$ and $B_2$ are directly bonded); and $B_2$ is a hydrogen atom, a cyano group, a halogen, a $C_{1-6}$ alkyl or alkoxy group, an acrylate group or a methacrylate group.

These side chain type liquid crystal oligomers may be used singly or in admixture. Also, the side chain type liquid crystal oligomers may not necessarily be of a single side chain type; they may be a copolymer containing of different side chains.

The molecular weight or the polymerization degree of these side chain type liquid crystal oligomers is an important factor for deciding the state of dispersion. When the molecular weight is small, no phase separation may take place, and when the molecular weight is large, since the liquid crystal particles are enlarged when phase separation occurs, light scattering is intensified. The number-average molecular weight of the liquid crystal oligomers preferably used in the present invention, calculated as that of polystyrene, preferably falls in a range of 1,200–10,000, and the average polymerization degree thereof is preferably in a range of 4–30, more preferably 5–20.

Now, the matrix polymers used for the optically anisotropic films in the first and second embodiments of the present invention are discussed.

The polymers used as matrix in the present invention are preferably those which keep safe from any change of optical properties or shape at the working temperature or at the temperature bonding to the LCD bell process since the produced optically anisotropic film is supposed to be used under a high-temperature condition. Preferred examples of such polymers are thermoplastic engineering polymers having a relatively high glass transition temperature, and plasticizer-loaded polymers having a comparatively high flow temperature.

Regarding the glass transition temperature or softening temperature of the matrix polymer, its lower limit is decided so that no change of optical properties or no deformation such as shrinkage of the film will be caused within the working temperature range of the liquid crystal displays. The upper limit is decided in view of the fact that since the polymer when molded into a film needs to be stretched under heating, too high glass transition temperature is undesirable in industrial terms. The preferred range of glass transition temperature or softening temperature of the matrix is 80°–250° C., more preferably 90°–200° C. Examples of the polymers which meet these conditions for use in the present invention include polycarbonates, polysulfones, polyarylates, polyether-sulfone, cellulose diacetate, cellulose triacetate, polyethylene terephthalate and polyethylene naphthalate. Of these polymers, polycarbonates, polyarylates, polysulfones, cellulose triacetate and polyethylene terephthalate are preferred.

In the present invention, the polymers which cause only limited birefringence in the optically anisotropic film are preferably used. More specifically, the polymers whose retardation measured by either of the following two methods (i) and (ii) is 90% or less, preferably 87% or less, of retardation of the optically anisotropic film are preferably used.

(i) The retardation induced when an optically anisotropic film was heated between at a temperature 20° C. higher than the isotropic phase transition temperature of the liquid crystal mixture in polymer and under the glass transition temperature or softening temperature of the film is designated as retardation by the polymer.

(ii) The retardation of a polymer film produced under the same conditions as in the production of the optically anisotropic film except that no liquid crystal compound was contained is designated retardation of the polymer film.

The method (ii) is applied in the case of a polymer with a small intrinsic birefringence. Generally birefringence An by polymer alignment is given from the following equation (4):

$$\Delta n = \Delta n^0 \times f \qquad (4)$$

wherein $\Delta n^0$ is intrinsic birefringence of the polymer and f is an orientational order parameter.

For reducing birefringence of the polymer, there can be employed, for instance, a method using a polymer with small intrinsic birefringence, a method in which a polymer with positive intrinsic birefringence and a polymer with negative intrinsic birefringence are mixed to reduce apparent intrinsic birefringence, and a method in which the function of alignment is lessened. Examples of the polymers with small intrinsic birefringence include polymethacrylate derivatives such as polymethyl methacrylate, poly-n-butyl methacrylate, poly-t-butyl methacrylate and polyglycol methacrylate; polyacrylate derivatives such as polymethyl acrylate and polyethyl acrylate; polyvinyl acetate, polyvinyl butylate, polyoxymethylphenylsilylene, norbornene-ethylene copolymers (such as APEL produced by Mitsui Petrochemical Co., Ltd.), norbornene-containing resins (such as ARTON produced by Nippon Synthetic Rubber Co., Ltd.), amorphous polyolefins (such as ZEONEX produced by Nippon Zeon Co., Ltd.), and acryl-butadiene-styrene copolymers (such as TOYOLAC Transparent Grade produced by Toray Corp.). Of these polymers, polymethylmethacrylate, poly-n-butyl methacrylate, poly-t-butyl methacrylate, norbornene-ethylene copolymers and amorphous polyolefins are preferred.

The methods for reducing apparent intrinsic birefringence are discussed below.

In case a mixture of a polymer having positive intrinsic birefringence and a polymer having negative intrinsic birefringence is used as matrix of optically anisotropic film, there can be used, for instance, polArvinyl chloride, polyvinylidene fluoride, vinylidene fluoride-ethylene trifluoride copolymers, polyethyleneoxide, polyphenylene oxide, polycarbonates and the like as the polymer having positive intrinsic birefringence. Polymethyl methacrylate, polystyrene and the like can be used as the polymer having negative intrinsic birefringence. Examples of the combinations of the polymers having positive intrinsic birefringence and the polymers having negative intrinsic birefringence, which are compatible with each other, and their mixing ratios (weight ratios) that can reduce apparent intrinsic birefringence are: 20:80–30:70 in the case of polyphenylene oxide and polystyrene combination, 30:70–40:60 in the case of polyethylene oxide and polymethyl methacrylate combination, 5:95–15:85 in the case of vinylidene fluoride-ethylene trifluoride copolymer and polymethyl methacrylate combination, 15:85–25:75 in the case of polyvinylidene fluoride and polymethyl methacrylate combination, and 15:85–25:75 in the case of polyvinyl chloride and polymethyl methacrylate combination. Of these combinations, polyphenylene oxide and polystyrene combination and polyethylene oxide and polymethyl methacrylate combination are preferred as such combinations are easily soluble in solvents.

For reducing the orientational order parameter, a method is usable in which a polymer mixed with a liquid crystal compound is stretched under heating at a temperature which is above the glass transition temperature of said liquid crystal compound and polymer but is below the melting temperature thereof.

Examples of the polymers usable in this method include polycarbonates, polysulfones, polyarylates, polyethersulfone, cellulose diacetate, cellulose triacetate, polystyrene, ethylene-vinyl alcohol copolymer, polyethylene terephthalate, and polyethylene naphthalate. Of these polymers, polycarbonates, polyarylates, polysulfones, cellulose triacetate, polyethylene terephthalate and polystyrene are preferred. It is recommended to use a polymer which does not cause any change of optical properties or shape in the working temperature range as a polymer matrix with small birefringence. Since the matrix polymer is stretched at a temperature above the glass transition temperature of the film for obtaining an optically anisotropic film of the present invention by using a matrix with small birefringence, a too high glass transition temperature of the matrix is undesirable in industrial terms. For this reason, a thermoplastic engineering polymer with relatively high glass transition temperature, or in the case of a plasticizer-loaded polymer, the one with a comparatively high flow temperature is preferably used.

A plasticizer may be added for reducing the glass transition temperature or softening temperature of the polymer mixed with a liquid crystal compound. The type and amount of the plasticizer used may be suitably selected within limits not prejudicial to the object of the present invention. Also, stretching may be carried out in a state abundant with residual solvent or in a state of being swollen with the solvent for reducing the apparent glass transition temperature or softening temperature. The type and content of the solvent are free to choose as far as no problem on appearance and optical qualities, such as whitening, foaming or nonuniform stretch, is induced during stretching.

An additive or additives may be contained in the matrix polymer for the purpose of affording mechanical strength to the polymer or for improving adhesiveness to the LCD panel when the produced film is bonded thereto. The type and amount of such additive(s) may be properly decided within limits not hampering the object of the present invention.

Now, the matrix of optically anisotropic film with high wavelength dispersion according to a third embodiment of the present invention is explained.

The matrix polymer in this embodiment may be selected from those mentioned above which have an Abbé's number of less than 31 when mixed with a liquid crystal compound and which are not opaque or are not opacified and cause no defects in appearance and/or optical qualities when a liquid crystal compound is added. When the liquid crystal compound to be mixed with the matrix has the α value of above 1.06, said α value being defined by the formula (2) in the case of homogeneously aligned singly, it is possible to select a matrix polymer from the above-mentioned ones which are not opaque, or not opacified or not damaged in surface appearance and optical qualities by the addition of the liquid crystal compound so as to make the α value of the mixture of the matrix and the liquid crystal compound 1.06 or less. In case the α value defined by the formula (2), which is given when the liquid crystal compound is homogeneously aligned, is less than 1.06, it is necessary to use a polymer having a high α value and intrinsic birefringence as matrix polymer or to combine the obtained film with an optically anisotropic film having a high α value for enlarging the α value of the whole film.

Examples of the polymers having an Abbé's number smaller than 31 are polysulfone, polyarylate, polyethylene sulfide and derivatives thereof.

A process for producing the optically anisotropic film according to any of the first to third embodiments of the present invention is described below.

Mixing of at least one liquid crystal compound and a polymer is preferably carried out in a state of solution in view of homogeneity. Typically, a polymer is suspended or dissolved in a solvent and then a liquid crystal compound is suspended or dissolved in the solution. It is preferable to use a solvent having a high solubility.

Various methods are available for forming a film from a mixture of liquid crystal and matrix polymer. For example, there can be used a solvent casting method in which the liquid crystal and matrix polymer are dissolved in a solvent and cast; an extrusion molding method in which said both materials are mixed in a solid state and extruded form a die to form a film; a calender roll method in which the materials are mixed in a solid state and calender rolled into a film; a press molding method using a press for forming a film. The casting method is preferred because of excellent film thickness precision. The film thickness is not specifically limited, but it is preferably in a range of 20–300 µm, more preferably 70–120 µm.

Uniaxial stretching of the film under heating can be accomplished by tentering, stretching between rolls, roll compression stretching or other means. Tentering or stretching between rolls is preferred for uniformity of the film plane. The way of heating of the film in the stretching operation is not subject to any specific restrictions. The heating temperature is properly selected in consideration of the transition temperatures of the matrix polymer and liquid crystal used, the temperature dependence of the produced optically anisotropic film and other factors, but it is preferably higher than the working temperature of the liquid display device, specifically 90° C. or above. As for the film stretch ratio, a too low stretch ratio results in an unsatisfactory alignment of the liquid crystal while a too high stretch ratio leads to a poor productivity, so that it is preferably in a range of 1.01–8 times, more preferably 1.2–6 times. The stretching rate and cooling speed may be properly decided.

Now, a process for producing the optically anisotropic film showing temperature dependence of retardation and excellent viewing angle characteristics according to the second embodiment of the present invention is described.

For the adjustment of the refractive index by controlling alignment in the thickness direction beside said uniaxial alignment, the following methods may be employed:

(1) A film made according to said film forming process is uniaxially stretched, and when it is heat relaxed at a temperature above the glass transition temperature or the softening temperature, as in the manner described in JP-A-6-300916, the film is shrunk in the direction of the axis of stretch while suppressing the stretch in the direction parallel to the film plane or the sheet plane and vertical to the axis of stretch.

(2) A film made according to said film forming process is uniaxially stretched, then a heat shrinkable film is bonded to at least one side of said uniaxially stretched film in such a manner that the axis of heat shrink of said heat shrinkable film will cross the axis of stretch of said uniaxially stretched polymer film at right angles, and the thus obtained film laminate is heat shrunk.

(3) To at least one side of a film made according to said film forming process is bonded a heat shrinkable film in such a manner that the axis of heat shrinkage of said heat shrinkable film will cross the axis of stretch of said uniaxially stretched polymer film at right angles, and the obtained laminate is further stretched, in the manner described in JP-A-5-157911.

Of these methods, (1) and (2) are preferred from the viewpoint of productivity and cost.

For producing an optically anisotropic film with large wavelength dispersion according to the third embodiment of the present invention, there can be applied the same process as used for producing an optically anisotropic film in which retardation varies with temperature according to the first embodiment of the present invention.

For producing a composite optically anisotropic film in the concept of the third embodiment of the present invention, there can be employed, for example, a process which comprises laminating a film of a polymer whose Abbé's number is smaller than 31 and a film made of a mixture of a polymer and at least one liquid crystal compound, and uniaxially stretching this laminated film, or a process in which said two types of film are stretched separately to form the optically anisotropic films and then they are bonded to each other. As the film made of a mixture of a polymer and at least one liquid crystal compound, those mentioned above can be employed. It is also possible, in this embodiment, to use the films whose α value is less than 1.06. When a laminate of a film of a polymer whose Abbé's number is smaller than 31 and a film made of a mixture of a polymer and at least one liquid crystal compound is stretched simultaneously, said both films may be bonded or may not be bonded to each other. When they are bonded, an adhesive may be used. Said uniaxial stretching method may be employed for stretching of the laminated film.

The optically anisotropic films according to the present invention may be provided with an ordinary transparent hard coat or gas barrier layer on one or both sides of the film for the purposes of surface protection and obtainment of adhesion by the adhesive.

The liquid crystal display devices provided according to the present invention comprise essentially a liquid crystal display cell, at least one optically anisotropic film and at least one polarizing film. In the case of an STN type liquid crystal display device for instance, the liquid crystal display cell may be one which is composed of a low-molecular liquid crystal having twisted nematic alignment with a twist angle of 180°–360° and which is held between the substrates provided with electrodes.

In the liquid crystal display devices according to the present invention, the location and the number of the optically anisotropic films to be used are not particularly limited;

said film(s) may be provided at any desired location as far as it is positioned between the polarizing film and the liquid crystal display cell. As for the angle made by the axis of absorption of the polarizing film or the rubbing direction of the liquid crystal display cell and the axis of stretch of the optically anisotropic film, it is decided so that the optimal contrast or viewing angle characteristics will be provided.

The present invention is explained in more detail in the following Examples; however, it should be recognized that the scope of the present invention is not restricted to these Examples.

The structure of the liquid crystal compounds was confirmed from elemental analysis, infrared absorption spectrum and H-NMR spectrum, and their molecular weight was determined by gel permeation chromatography (GPC).

Retardation of the obtained optically anisotropic films was determined by the Sénarmont's method using a polarization microscope (OPTIPHOTO 2-POL mfd. by Nikon Co., Ltd.). The wavelength of the light applied for determination was 546 nm.

Dispersion of retardation of the obtained optically anisotropic films was determined by the Sénarmont's method using a polarization microscope with various λ/Δ plates (TFM-120 ATF mfd. by Oak Corp.) with the sample film being kept at 30° C. or 80° C. using a hot stage. $R_F$ and $R_D$ values were determined from interpolation of the values of retardation measured at 400 nm, 480 nm, 550 nm, 600 nm and 800 nm.

Temperature dependence of retardation was determined by measuring retardation while heating each obtained sample of optically anisotropic film by a hot stage (FP 8-2HT Hot Stage mfd. by Mettier). Haze was determined according to JIS K7105 using a haze computer (HGM-2DP mfd. by Suga Testing Machinery Co., Ltd.).

EXAMPLE 1

A cyclic siloxane oligomer (showing a nematic phase; nematic/isotropic phase transition temperature: 121° C.; number-average molecular weight calcd. as polystyrene: 2,030, corresponding to a polymerization degree of 5) having in the side chain the compounds of the following formulae [VI], [VII] and [VIII] in a ratio of 1:1:1.5 and also containing a monomer of the following formula [IX] in a ratio of 28.2:71.7 to the oligomer was mixed with polyphenylene oxide (H-30 grade; number-average molecular weight: 4,000; produced by Nippon Polyether Co., Ltd.) and polystyrene (number-average molecular weight: 100,000, produced by Uchida Chemical Co., Ltd.) in a polyphenylene oxide: polystyrene:cyclic siloxane oligomer weight ratio of 26:64:10, and the mixture was dissolved in methylene chloride to a concentration of 20% by weight.

This solution was cast onto a polyethylene terephthalate film (which may hereinafter be referred to as PET film; TOYOBO ESTER FILM E-7006 produced by Toyo Boseki KK) from a 0.5 mm-gap applicator and air dried to form a film.

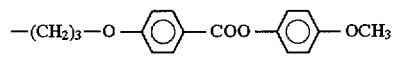  [VI]

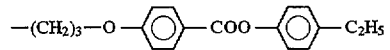  [VII]

-continued

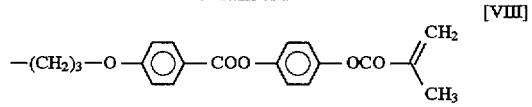  [VIII]

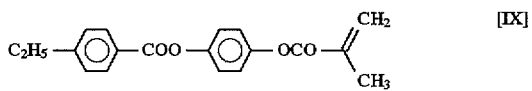  [IX]

This film was stretched 1.9-fold by a tensile tester (STROGRAPH-T mfd. by Toyo Fine Machinery Co., Ltd.) at a rate of 1.0 cm/min and 100° C. to obtain an optically anisotropic film showing a retardation of 495 nm at 30° C. The thickness of this film was 66 μm and its retardation per 1 μm was 7.5 nm. Haze of the film was less than 10%.

Retardation of the obtained optically anisotropic film at 80° C. was 443 nm, which was 89.5% of the retardation at 30° C.

In practical use of this optically anisotropic film set in an STN type liquid crystal display device, it shows as excellent display performance at 80° C. as at room temperature.

COMPARATIVE EXAMPLE 1

Polyphenylene oxide and polystyrene were mixed in a weight ratio of 29:71, and the mixture was dissolved in chloroform to a concentration of 20% by weight. The solution was treated in the same way as in Example 1 to obtain a film. When this film was stretched 1.9-fold at 100° C. as in Example 1, it showed a retardation of 24 nm at 30° C. Film thickness was 56 μm and retardation per 1 μm was 0.43 nm, which was only 5.7% of that of the film obtained in Example 1.

EXAMPLE 2

Polymethyl methacrylate (number-average molecular weight: 130,000, produced by Aldrich Co., Ltd.) and the same polysiloxane-based liquid crystal oligomer as described in the embodiment (1) were mixed in a weight ratio of 93:7, and the mixture was dissolved in methylene chloride to a concentration of 33% by weight and treated according to Example 1 to obtain a film. This film was stretched 2.0-fold using a tensile tester at a rate of 1.0 cm/min and 100° C. to obtain an optically anisotropic film showing a retardation of 372 nm at 30° C. Film thickness was 110 μm, and retardation per μm was 3.38 nm. This optically anisotropic film was bonded to a glass plate with an adhesive and its retardation at 80° C. was determined. It was 349 nm, 93.8% of that at 30° C.

In use of this optically anisotropic film set in an STN type liquid crystal display device, its display performance at 80° C. is as good as at room temperature.

COMPARATIVE EXAMPLE 2

Polymethyl methacrylate same as used in Example 2 was dissolved in methylene chloride to a concentration of 33% by weight, and the solution was cast onto a PET film from a 0.5 m-gap applicator. The obtained film was stretched 2.0-fold in the same way as in Example 2. The resultant film, which was 91 μm thick, showed a retardation of 3.3 nm at room temperature and 0.036 nm per μm, which was only 1.1% of that of the optically anisotropic film obtained in Example 2.

EXAMPLE 3

The polysiloxane-based liquid crystal oligomer described in Example 1 and a polycarbonate (Panlite C-1400 produced by Teijin Corp.) were mixed in a weight ratio of 20:80, and the mixture was dissolved in methylene chloride to a concentration of 15% by weight. This solution was cast onto a glass plate using a 500 μm-gap applicator, and the resulting film was stretched 2.0-fold at 150° C. to obtain a retardation film. This film showed a retardation of 603.9 nm at 30° C. and was 43 μm thick.

Retardation of the obtained optically anisotropic film at 80° C. was 574.2 nm, which was 95.0% of that at 30° C.

COMPARATIVE EXAMPLE 3

The polycarbonate used in Example 3 was dissolved in methylene chloride to a concentration of 20% by weight, and the solution was cast onto a glass plate from a 500 μm-gap applicator to obtain a 103 μm thick film. This film was stretched 2.0-fold at 190° C. to obtain a retardation film. It showed a retardation of 370 nm at 30° C.

In use of this retardation film set in an STN type liquid crystal display device as in Example 2, its display performance at 80° C. is worse than that at room temperature.

EXAMPLE 4

A cyclic siloxane-based liquid crystal oligomer having a mesogen group of the following formula [X] in the side chain(showing a nematic phase; nematic/isotropic phase transition temperature: 113.6° C.; number-average molecular weight calcd. as polystyrene: 2,200, corresponding to a polymerization degree of 6) and the polycarbonate described in Example 3 were mixed in a weight ratio of 15:85, and the mixture was dissolved in methylene chloride to a concentration of 20 wt %.

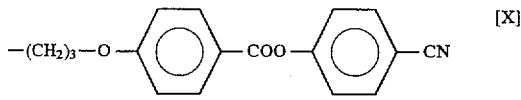
[X]

This solution was cast from a 500 μm-gap applicator to form a film. This film was stretched 1.7-fold at 170° C. to obtain a 63 μm thick optically anisotropic film showing retardation of 405.1 nm and 363.9 run at 30° C. and 80° C., respectively, the retardation at 80° C. being 89.8% of that at 30° C. Haze of the obtained film was 2.3%.

In use of this optically anisotropic film set in an STN type liquid crystal display device, it shows as good display performance at 80° C. as at room temperature.

EXAMPLE 5

A linear siloxane-based liquid crystal oligomer having a mesogen group of the following formula [XI] in the side chain (showing a nematic phase; nematic/isotropic phase transition temperature: 66.6° C.; number-average molecular weight calcd. as polystyrene: 4,650, corresponding to a polymerization degree of 14) and the polycarbonate described in Example 3, were mixed in a weight ratio of 7:93, and the mixture was dissolved in methylene chloride to a concentration of 20 wt %.

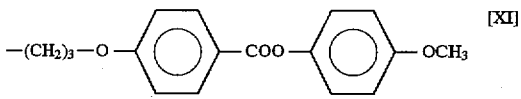
[XI]

This solution was cast from a 500 μm-gap applicator to form a film, and this film was stretched 1.5-fold at 180° C. There was obtained a 106 μm thick optically anisotropic film showing retardation of 556.6 nm and 316.6 nm at 30° C. and 80° C., respectively, the retardation at 80° C. being 56.8% of that at 30° C. Haze of the film was 2.6%.

The obtained optically anisotropic film, in its use in an STN type liquid crystal display device, shows as good display performance at 80° C. as at room temperature.

EXAMPLE 6

The procedure of Example 5 was carried out except that a linear siloxane-based liquid crystal oligomer same as used in Example 5 was mixed with the polycarbonate described in Example 3 in a weight ratio of 10:90 to form a film.

This film was stretched 1.5-fold at 180° C. to obtain an optically anisotropic film showing retardation of 469.4 nm, 361.6 nm and 151.9 nm at 30° C., 60° C. and 80° C., respectively, the retardation at 60° C. and 80° C. being 77.0% and 32.3%, respectively, of that at 30° C. Haze of the film was 3.8%.

When this optically anisotropic film was heated to 100° C., it showed a retardation of 146.4 nm. Contribution of the polycarbonate matrix to retardation of the optically anisotropic film at 30° C. was 31.1%.

In use of the film in an STN type liquid crystal display device, it shows the same display performance at 80° C. as at room temperature.

EXAMPLE 7

A linear siloxane-based liquid crystal oligomer having a mesogen group of the above-shown formula [XI] (showing a nematic phase; nematic/isotropic phase transition temperature: 76.2° C.; number-average molecular weight calcd. as polystyrene: 6,568, corresponding to a polymerization degree of 17) and the polycarbate described in Example 3 were mixed in a weight ratio of 3:97, and the mixture was dissolved in methylene chloride to a concentration of 20 wt %.

This solution was cast from a 500 μm-gap applicator to form a film, and this film was stretched 1.7-fold at 190° C. to obtain a 90 μm thick optically anisotropic film showing retardation of 405.4 nm and 336.9 nm at 30° C. and 80° C., respectively, the retardation at 80° C. being 83.1% of that at 30° C. Haze of the film was 3.8%.

In use of this optically anisotropic film set in an STN type liquid crystal display device, its display performance at 80° C. is as good as at room temperature.

EXAMPLE 8

A polycarbonate used in Example 3 and a cyclic siloxane-based liquid crystal oligomer (showing a nematic phase; nematic/isotropic phase transition temperature: 130° C.; number-average molecular weight calcd. as polystyrene: 1,600) were mixed in a weight ratio of 4:1, and the mixture was dissolved in methylene chloride to a concentration of 20 wt %. This solution was cast onto a glass plate from a 0.5 mm-gas applicator and air dried to form a film. This film was stretched 2.0-fold at a rate of 33%/min and 160° C. using a tensile tester to obtain a film which showed $R_0$ at 30° C.=622 nm, $R_{40}/R_0$ at 30° C.=1.109, ($R_0$ at 80° C.)/($R_0$ at 30° C.)=0.881, and ($R_{40}$ at 80° C.)/($R_{40}$ at 30° C.)=0.875.

To both sides of this film was bonded a biaxially stretched polypropylene film (PYLEN FILM produced by Toyo Boseki KK). This composite film was shrunk 7% in the direction of the axis of stretch at a rate of 10%/min and 160° C., with the portion of the film in the direction of the axis of stretch being fixed by chucks of the tensile tester while the portion of the film in the direction vertical to the axis of stretch being left free. In this operation, the film was shrunk 20% in the width direction.

The thus obtained optically anisotropic film showed $R_0=380$ nm, $R_{40}/R_0=0.985$ (both at 30° C.), ($R_0$ at 80° C.)/($R_0$ at 30° C.)=0.845, and ($R_{40}$ at 80° C.)/($R_{40}$ at 30° C.)=0.820.

This film is set in an STN type liquid crystal display device and its display performance in the temperature range from room temperature to 80° C. is observed. It shows good white-and-black display which remained almost unchanged even when the film is heated from room temperature up to 80° C.

COMPARATIVE EXAMPLE 4

A 20 wt % methylene chloride solution of a polycarbonate (Panlite C-1400) was cast onto a glass plate from a 0.5 mm-gap applicator and air dried to form a film.

This film was stretched 2.0 times by a tensile tester at a rate of 33%/min and 180° C. to obtain a film with $R_0$ at 30° C.=764 nm, $R_{40}/R_0$ at 30° C.=1.103, ($R_0$ at 80° C.)/($R_0$ at 30° C.)=1.005, and ($R_{40}$ at 80° C.)/($R_{40}$ at 30° C.)=1.000.

This film was bonded to both sides of a biaxially aligned polycarbonate film (Sumikalight SEF-380570 mfd. by Sumitomo Chemical Co., Ltd.) with the direction of its main axis of stretch being arranged vertical to the axis of stretch of the first-said film. This bonded film composite was shrunk 7% in the direction of the axis of stretch at a rate of 10%/min and 175° C. with the film portion positioned in the direction of the axis of stretch being fixed between the chucks of the tensile tester while the portion in the direction vertical to the axis of stretch being left free. In this operation, the film was shrunk 18% in the width direction.

In the thus obtained retardation film, $R_0$ at 30° C.=377 nm, $R_{40}/R_0$ at 30° C.=0.995, ($R_0$ at 80° C.)/($R_0$ at 30° C.)=1.006, and ($R_{40}$ at 80° C.)/($R_{40}$ at 30° C.)=1.003, which indicates almost no temperature dependence of retardation.

This retardation film is set in an STN type liquid crystal display device in the same way as in Example 1 and its display performance is visually observed in the temperature range from room temperature to 80° C. The display performance is good at room temperature but lowered as the temperature rises to 80° C.

EXAMPLE 9

A cyclic siloxane-based liquid crystal oligomer (showing nematic phase; nematic/isotropic phase transition temperature: 130° C.; number-average molecular weight calcd. as polystyrene: 1,700) was mixed in polymethyl methacrylate (SUMIPEX MHF mfd. by Sumitomo Chemical Co., Ltd.) in a weight ratio of 4:1 and the mixture was dissolved in methylene chloride to a concentration of 20 wt %. This solution was cast onto a glass plate from a 0.5 mm-gas applicator and air dried to form a film.

This film was stretched 2.0-fold by STROGRAPH-T at a rate of 33%/min and 100° C. to obtain a film with $R_0$ at 30° C.=718 nm, $R_{40}/R_0$ at 30° C.=1.102, ($R_0$ at 80° C.)/($R_0$ at 30° C.)=0.833, and ($R_{40}$ at 80° C.)/($R_{40}$ at 30° C.)=0.838.

To both sides of this film was bonded a biaxially stretched PET film (SPACE CLEAN mfd. by Toyo Boseki KK), and this composite film was shrunk 7% in the direction of the axis of stretch at a rate of 10%/min and 100° C., with the film portion positioned in the direction of the axis of stretch being fixed between the chucks of the tensile tester while the film portion in the direction vertical to the axis of stretch being left free. In this operation, the film was shrunk 18% in the width direction. The thus obtained optically anisotropic film showed $R_0=383$ nm, $R_{40}/R_0=0.969$ (both at 30° C.), ($R_0$ at 80° C.)/($R_0$ at 30° C.)=0.829, and ($R_{40}$ at 80° C.)/($R_{40}$ at 30° C.)=0.820.

This optically anisotropic film is set in an STN type liquid crystal display device and its display performance is visually observed in the temperature range from room temperature to 80° C. There is obtained good white-and-black display which remains almost unchanged. even when the ambient temperature is elevated from room temperature to 80° C.

EXAMPLE 10

A polycarbonate (Panlite C-1400) and a cyclic siloxane-based liquid crystal oligomer (showing nematic phase; nematic/isotropic phase transition temperature: 130° C.; number-average molecular weight calcd. as polystyrene: 1,600; α value in horizontal alignment: 1.08) were mixed in a weight ratio of 85:15, and the mixture was dissolved in methylene chloride to a concentration of 20 wt %. This solution was cast onto a glass plate from a 0.5 mm-gap applicator and air dried to form a film.

This film was stretched 2.0-fold using a tensile tester STROGRAPH-T at a rate of 50%/min and 150° C. to obtain a film with $R_F=400$ nm and $\alpha=1.07$ at 30° C., $R_F=368$ nm and $\alpha=1.07$ at 80° C., and ($R_F$ at 80° C.)/($R_F$ at 30° C.)=0.92.

The thus obtained optically anisotropic film is set in an STN type liquid crystal oligomer and its display performance in the temperature range from room temperature to 80° C. is visually served. Good white-and-black display can be obtained even when the ambient temperature is elevated from room temperature to 80° C.

EXAMPLE 11

A polymethyl methacrylate (SUMIPEX MHF mfd. by Sumitomo Chemical Co., Ltd.) and a cyclic siloxane-based liquid crystal oligomer (showing nematic phase; nematic/isotropic phase transition temperature: 130° C.; number-average molecular weight calcd. as polystyrene: 1,600; α value in horizontal alignment=1.08) were mixed in a weight ratio of 85:15, and the mixture was dissolved in methylene chloride to a concentration of 20 wt %. This solution was cast onto a glass plate from a 0.5 mm-gap applicator and air dried to form a film.

This film was stretched 2.0-fold by a tensile tester (STROGRAPH-T) at a rate of 33%/min and 100° C. to obtain a film with $R_F=405$ nm and $\alpha=1.08$ at 30° C., RF=372 nm and $\alpha=1.08$ at 80° C., and (RF at 80° C.)/(RF at 30° C.)=0.92.

The obtained optically anisotropic film is set in an STN type liquid crystal display device and its display performance is visually observed in the temperature range from room temperature to 80° C. Good white-and-black display is obtained even when the ambient temperature is elevated from room temperature to 80° C.

EXAMPLE 12

A polycarbonate (Panlite C-1400) and a cyclic siloxane-based liquid crystal oligomer (showing nematic phase; nematic/isotropic phase transition temperature: 30° C.; number-average molecular weight calcd. as polystyrene: 1,600; α value in horizontal alignment=1.08) were mixed in a weight ratio of 85:15 and dissolved in methylene chloride to a concentration of 20 wt %. This solution was cast onto a glass plate from a 0.5 mm-gap applicator and air dried to form a film.

This film was stretched 1.4-fold by a tensile tester (STROGRAPH-T) at a rate of 33%/min and 180° C. and bonded to a polysulfone film ($R_F$=150 nm; α=1.11) with their axes of stretch parallel to each other to obtain a multi-layer optically anisotropic film with $R_F$=400 nm and α=1.07 at 30° C., $R_F$=370 nm and α=1.07 at 80° C., and ($R_F$ at 80° C.)/($R_F$ at 30° C.)=0.94.

This optically anisotropic film is set in an STN type liquid crystal display device and its display performance in the temperature range from room temperature to 80° C. is visually observed. Good white-and-black display can be obtained even when the temperature is elevated from room temperature up to 80° C.

EXAMPLE 13

An optically anisotripic film produced by the same method as described in Example 5 is used in a homogeneously oriented ECB type liquid crystal display device, which shows the same display performance at 80° C. as that at room temperature.

EXAMPLE 14

An optically anisotropic film produced by the same method as described in Example 5 is used in a hybrid aligned ECB type liquid crystal display device, which shows the same display performance at 80° C. as that at room temperature.

EXAMPLE 15

An optically anisotropic film produced by the same method as described in Example 5 is used in an OCB type liquid crystal display device, which shows the same display performance at 80° C. as that at room temperature.

COMPARATIVE EXAMPLE 5

A 20 wt % methylene chloride solution of a polycarbonate (Panlite C-1400) was cast onto a glass plate from a 0.5 mm-gap applicator and air dried to form a film.

This film was stretched by a tensile tester (STROGRAPH-T) at a rate of 33%/min and 170° C. to obtain an optically anisotropic film with $R_F$=394 nm and α=1.06 at 30° C., $R_F$=394 nm and α=1.06 at 80° C., and ($R_F$ at 80° C.)/($R_F$ at 30° C.)=1.000.

This optically anisotropic film is set in an STN type liquid crystal display device and its display performance in the temperature range from room temperature to 80° C. is visually observed. Good white-and-black display can be obtained at room temperature, but the display performance lowers as the ambient temperature rises from room temperature to 80° C.

COMPARATIVE EXAMPLE 6

A polysulfone film (Sumilight FS-1200 mfd. by Sumitomo Bakelite Co., Ltd.) was cut into pieces and dissolved in methylene chloride to prepare a 20 wt % solution. This solution was cast onto a glass plate from a 0.5 mm-gap applicator and air dried to form a film. This film was stretched 2.0 times by STROGRAPH-T at a rate of 33%/min and 210° C. to obtain an optically anisotropic film with $R_F$=427 nm and α=1.11 at 30° C., $R_F$=427 nm and α=1.11 at 80° C., and ($R_F$ at 80° C.)/($R_F$ at 30° C.)=1.000.

This optically anisotropic film is set in an STN type liquid crystal display device and its display performance in the temperature range from room temperature to 80° C. is visually observed. Good white-and-black display can be obtained at room temperature, but the display performance lowered as the temperature rises from room temperature to 80° C.

COMPARATIVE EXAMPLE 7

Polyvinyl chloride (produced by Wako Pure Chemical Industries, Ltd; polymerization degree: approx. 1,100) and a liquid crystal mainly comprising a compound of the following structural formula (α in horizontal alignment=1.09) were mixed in a weight ratio of 3:1 and dissolved in tetrahydrofnran to a concentration of 20 wt %. This solution was cast onto a glass plate from a 0.5 mm-gap applicator and air dried, followed by additional drying in a vacuum dryer at room temperature to form a film.

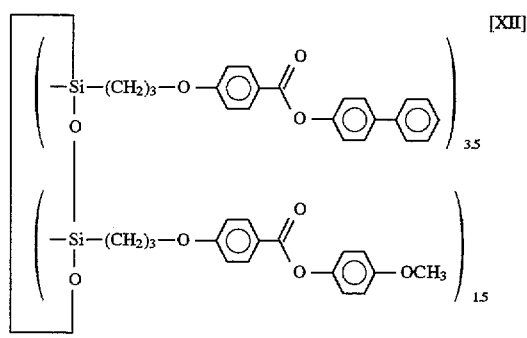

This film was stretched 2.0-fold by STROGRAPH-T at a rate of 50%/min and 100° C. In this stretched film, $R_F$=503 nm and α=1.06 at 30° C. This film was bonded to a glass plate with an adhesive and heated to 80° C. $R_F$ dropped to 400 nm but it remained at 400 nm even when the temperature was returned to 30° C. Thereafter, the ambient temperature was raised and lowered repeatedly between 80° C. and 30° C., but no change of $R_F$ was noted. (($R_F$ at 80° C.)/($R_F$ at 30° C.)=1.00). When this film was heated to 80° C. without bonding it to a glass plate, it was shrunk and disappeared.

This optically anisotropic film bonded to a glass plate and heated to 80° C. is set in an STN type liquid crystal display device and its display performance in the temperature range from room temperature to 80° C. is visually observed. Good white-and-black display can be obtained at room temperature but the display performance lowers as the ambient temperature rose from room temperature to 80° C.

The optically anisotropic film according to the present invention has a temperature dependence of retardation corresponding to that of the liquid crystal display device used in combination with the film. Further, as this film has a three-dimensional refractive structure and wavelength dispersibility in addition to said specific temperature dependence of retardation in conformity to the properties of the liquid crystal display cell used with the film, this film has a temperature compensating effect and is excellent in viewing angle characteristics and display performance. By using this optically anisotropic film in a liquid crystal display device, especially in an STN type or ECB type liquid crystal display device, it is possible to obtain a liquid crystal display device having excellent display performance and viewing angle characteristics at high temperatures at low cost and without needing any complicate manufacturing process.

What is claimed is:

1. An optically anisotropic film in which retardation at 80° C. is 20–97% of that at 30° C., said film comprising a mixture of at least one liquid crystal compound and a transparent or semitransparent polymer, the ratio of said liquid crystal compound being 0.5–50% by weight based on the combined weight of said liquid crystal compound and said polymer.

2. An optically anisotropic film in which retardation at 60° C. is 50–99% of that at 30° C., said film comprising a mixture of at least one liquid crystal compound and a transparent or semitransparent polymer, the ratio of said liquid crystal compound being 0.5–50% by weight based on the combined weight of said liquid crystal compound and said polymer.

3. An optically anisotropic film according to claim 1 or 2, characterized in that the film has a haze of 10% or less.

4. An optically anisotropic film characterized in that the value of retardation measured from the frontal side of the film at 30° C. is 50–3,000 nm, the value of retardation at 80° C. is 20–97% of that at 30° C., and the ratio of retardation values ($R_{40}/R_0$) at 30° C. is defined by:

$$0.900 < R_{40}/R_0 < 1.100 \quad (1)$$

wherein $R_{40}$ is retardation of the film measured in a state where the film is slanted 40° from the horizontal, with a slow axis as the axis of rotation in the case of a film having positive intrinsic birefringence and with a fast axis as the axis of rotation in the case of a film having negative intrinsic birefringence, and $R_0$ is retardation measured in a non-slanted state (horizontal state), in a polarization microscope provided with a Sénarmont compensator.

5. An optically anisotropic film according to claim 4, wherein said film is made from a mixture of at least one liquid crystal compound and a transparent or semitransparent polymer, the ratio of said liquid crystal compound being 0.5–50% by weight based on the total weight of said liquid crystal compound and said polymer.

6. A process for making an optically anisotropic film set forth in 4 or 5, which comprises mixing a polymer and at least one liquid crystal compound, molding the mixture into a film, and subjecting the molded film to stretching and a treatment for increasing alignment in the thickness direction of the film.

7. An optically anisotropic film characterized in that the value of retardation of said film at 80° C. is 20–97% of that at 30° C. and the value of α defined by the following equation (2) exceeds 1.06:

$$\alpha = R_F/R_D \quad (2)$$

wherein $R_F$ is the value of retardation measured with F-line (wavelength: 486 nm) of hydrogen, and $R_D$ is the value of retardation measured with D-line (wavelength: 589 nm) of sodium.

8. An optically anisotropic film according to claim 7, wherein said film is made from a mixture of at least one liquid crystal compound and a transparent or semitransparent polymer, the ratio of said liquid crystal compound in the mixture being 0.5–50% by weight based on the combined weight of said liquid crystal compound and said polymer.

9. An optically anisotropic film according to claim 8, wherein the Abbé's number defined by the following equation (3) of the transparent or semitransparent polymer is less than 31:

$$v_D = (n_D - 1)/(n_F - n_C) \quad (3)$$

wherein $n_C$, $n_D$ and $n_F$ are the refractive indices to the C line (wavelength: 656 nm), D line (wavelength: 589 nm) and F line (wavelength: 486 nm), respectively, of the Fraunhofer-line.

10. An optically anisotropic film according to claim 8, wherein the value of α defined by the formula (2), which is shown when the liquid crystal compound is uniaxially aligned alone, exceeds 1.06.

11. A process for making an optically anisotropic film set forth in claim 1, 2, 7, 8, 9 or 10, which comprises mixing a polymer and at least one liquid crystal compound, molding the mixture into a film, and uniaxially stretching the film under heating.

12. A liquid crystal display device having an optically anisotropic film set forth in any one of claim 1, 2, 4, 5, 7, 8, 9 or 10.

13. A composite optically anisotropic film comprising a laminate of an optically anisotropic film made by uniaxially stretching a polymer whose Abbé's number is less than 31 and an optically anisotropic film in which the retardation at 80° C. is 20–97% of that at 30° C.

14. A process for making a composite optically anisotropic film set forth in claim 13, which comprises laminating a polymer film whose Abbé's number ($v_D$) is less than 31 and a film made from a mixture of a polymer and at least one liquid crystal compound, and uniaxially stretching the laminated film.

15. An optically anisotropic film in which retardation at 80° C. is 20–97% of that at 30° C., said film comprising a mixture of at least one liquid crystal compound and a transparent or semitransparent polymer, the ratio of said liquid crystal compound being 0.5–50% by weight based on the combined weight of said liquid crystal compound and said polymer, wherein a glass transition temperature of said polymer is 80° C. or above.

16. An optically anisotropic film in which retardation at 60° C. is 50–99% of that at 30° C., said film comprising a mixture of at least one liquid crystal compound and a transparent or semitransparent polymer, the ratio of said liquid crystal compound being 0.5–50% by weight based on the combined weight of said liquid crystal compound and said polymer, wherein a glass transition temperature of said polymer is 80° C. or above.

17. An optically anisotropic film in which retardation at 80° C. is 20–97% of that at 30° C., said film comprising a mixture of at least one liquid crystal compound and a transparent or semitransparent polymer, the ratio of said liquid crystal compound being 0.5–50% by weight based on the combined weight of said liquid crystal compound and said polymer, wherein retardation of the film measured at a temperature 20° C. higher than an isotropic phase transition temperature of said liquid crystal compound is 90% or less of the retardation of said film at 30° C.

18. An optically anisotropic film in which retardation at 60° C. is 50–99% of that at 30° C., said film comprising a mixture of at least one liquid crystal compound and a transparent or semitransparent polymer, the ratio of said liquid crystal compound being 0.5–50% by weight based on the combined weight of said liquid crystal compound and said polymer, wherein retardation of the film measured at a temperature 20° C. higher than an isotropic phase transition temperature of said liquid crystal compound is 90% or less of the retardation of said film at 30° C.

19. An optically anisotropic film according to claim 17 or 18, wherein the transparent or semitransparent polymer is a mixture of a polymer having positive intrinsic birefringence and a polymer having negative intrinsic birefringence, said both polymers being compatibilized with each other.

* * * * *